T. HOLMES.
Carburetting Apparatus.

No. 135,806.

Patented Feb. 11, 1873.

Witnesses,
Chas. H. Smith
Harold Serrell

Inventor
Thomas Holmes,
Lemuel W. Serrell,
atty

UNITED STATES PATENT OFFICE.

THOMAS HOLMES, OF BROOKLYN, NEW YORK.

IMPROVEMENT IN CARBURETING APPARATUS.

Specification forming part of Letters Patent No. 135,806, dated February 11, 1873.

*To all whom it may concern:*

Be it known that I, THOMAS HOLMES, M. D., of Brooklyn, E. D., Kings county, State of New York, have invented an Improvement in Carbureting Apparatus, of which the following is a specification:

This apparatus is especially designed for carbureting the ordinary street-gas in its passage from the meter to the burners; but it may be employed for carbureting air.

I employ a range of sheet-metal septums, that are perforated and covered with cloth, and these are supported within a casing, into which the liquid hydrocarbon is supplied from a tray with overflow nipples. The reservoir containing the gasoline or liquid hydrocarbon is connected with the carbureter by pipes, in such a manner as to insure uniformity of supply.

Figure 1:
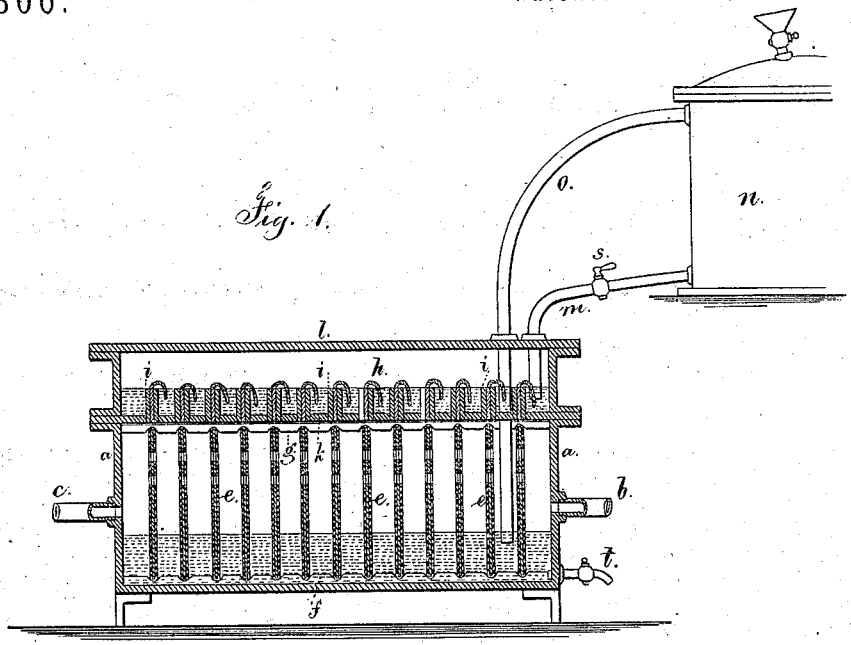
Figure 2:

In the drawing, Figure 1 is a vertical section of the apparatus, and Fig. 2 is a plan with a portion of the carbureter in section.

The vessel $a$ is connected at one end with the supply gas or air pipe $b$, and at the other end with the pipe $c$ leading to the burners. Within the vessel $a$ is a range of vertical perforated plates, $e$, upon each of which is a sack or bag, of flannel or other woven material, and these form septums through which the air or gas passes freely. At the bottom of the vessel $a$ is a notched bar, $f$, and at the top a similar bar, $g$, so that the septums are held in the proper positions. There is a tray, $h$, above the vessel $a$ in which are tubes $i\ i$ containing lamp-wick or similar material, and $k$ and $l$ are the casing and cover to the tray to retain the liquid hydrocarbon, and supply the same by the capillary action to the upper parts of the septums $e$, and whatever liquid runs into the said vessel $a$ is raised by the capillary action of the cloth upon the septums. The gas or air passing through the septums becomes surcharged with hydrocarbon vapor to increase its illuminating properties.

The liquid is supplied to the tray $h$ by the pipe $m$ leading from the reservoir $n$, and an equalizing-pipe, $o$, passes down to the surface of the liquid in the vessel $a$. When the lower end of the tube $o$ is open the liquid is free to run from the vessel $n$ into the tray $h$; but when the liquid hydrocarbon rises and covers the end of said pipe $o$, the flow is stopped in consequence of the liquid being drawn up in the pipe $o$ until the hydrostatic column balances that in the reservoir $n$, when no more liquid will escape until the hydrocarbon in the vessel $a$ is sufficiently evaporated to be below the end of the tube $o$. A regulating-cock may be introduced at $s$, and a draw or overflow cock at $t$.

I claim as my invention—

The tray $h$ and tubes $i$ above the septums $e$ in the vessel $a$, in combination with the supporting-bars $f\ g$, supply-vessel $n$, equalizing-pipe $o$, and pipe $m$ to the tray $h$, as and for the purposes set forth.

Signed by me this 10th day of December, 1872.

THOS. HOLMES, M. D.

Witnesses:
GEO. T. PINCKNEY,
CHAS. H. SMITH.